(12) United States Patent
King

(10) Patent No.: US 11,572,867 B1
(45) Date of Patent: Feb. 7, 2023

(54) AVIAN AVOIDANCE SYSTEM FOR WIND TURBINES

(71) Applicant: Alders Wind Technology, LLC, Madisonville, TX (US)

(72) Inventor: George R. King, The Woodlands, TX (US)

(*) Notice: Subject to any disclaimer, the term of this patent is extended or adjusted under 35 U.S.C. 154(b) by 0 days.

(21) Appl. No.: 17/708,454

(22) Filed: Mar. 30, 2022

(51) Int. Cl.
*F03D 80/10* (2016.01)
*A01M 29/06* (2011.01)

(52) U.S. Cl.
CPC ............ *F03D 80/10* (2016.05); *A01M 29/06* (2013.01); *F05D 2240/30* (2013.01)

(58) Field of Classification Search
CPC ...... F03D 80/10; A01M 29/06; F05D 2240/30
See application file for complete search history.

(56) References Cited

U.S. PATENT DOCUMENTS

| | | | |
|---|---|---|---|
| 2,701,540 A * | 2/1955 | Hamilton | B62J 6/20 29/889.6 |
| 5,270,707 A * | 12/1993 | Schulte | B64D 47/06 340/961 |
| 6,623,243 B1 * | 9/2003 | Hodos | A01M 29/06 416/61 |
| 6,641,366 B2 | 11/2003 | Nordhoff | |
| 6,786,899 B1 * | 9/2004 | Lai | A61B 3/113 606/4 |
| 6,887,031 B1 | 5/2005 | Tocher | |
| 6,945,752 B1 | 9/2005 | Wobben | |
| 8,025,480 B1 * | 9/2011 | King | F03D 80/10 416/5 |
| 8,742,977 B1 * | 6/2014 | Piesinger | G01S 13/93 342/159 |
| 9,886,864 B1 | 2/2018 | Chubb | |
| 10,351,258 B1 * | 7/2019 | Barnes | G01V 8/20 |
| 11,093,738 B2 * | 8/2021 | Paszek | H04R 1/326 |
| 2007/0264116 A1 * | 11/2007 | Dempster | F03D 9/257 415/4.2 |
| 2008/0298962 A1 | 12/2008 | Sliwa | |
| 2009/0266160 A1 * | 10/2009 | Jeffrey | F03D 17/00 73/455 |
| 2010/0236497 A1 * | 9/2010 | Philiben | A01K 11/008 119/712 |
| 2017/0342966 A1 * | 11/2017 | Barber | F03D 80/10 |
| 2019/0241278 A1 * | 8/2019 | Khawam | F21S 10/06 |

FOREIGN PATENT DOCUMENTS

| | | | | |
|---|---|---|---|---|
| EP | 2831412 B1 * | 8/2017 | ............ | A01M 29/16 |
| EP | 3183603 B1 | 2/2020 | | |

* cited by examiner

*Primary Examiner* — Juan G Flores
*Assistant Examiner* — Brian Christopher Delrue
(74) *Attorney, Agent, or Firm* — Egbert, McDaniel & Swartz, PLLC

(57) ABSTRACT

A wind turbine apparatus has a tower and a plurality of blades rotatably mounted relative to the tower. Each of the plurality of blades has a reflective media on a surface thereof. The reflective media has at least a pair of primary colors. Each primary color is different from each other. The reflective media on one of the plurality of blades is arranged in an order different than in order of the reflective media of an adjacent blade. The reflective media can further include a mixed color of white. The reflective media comprises bands extending across a surface of the blade.

15 Claims, 6 Drawing Sheets

AVIAN AVOIDANCE SYSTEM FOR WIND TURBINES

CROSS-REFERENCE TO RELATED APPLICATIONS

Not applicable.

BACKGROUND OF THE INVENTION

1. Field of the Invention

The present invention relates to wind turbine apparatus. More particularly, the present invention relates to wind turbine apparatus that have blades that are designed so as to avoid contact with fowl flying in proximity to the blades.

2. Description of Related Art Including Information Disclosed Under 37 CFR 1.97 and 37 CFR 1.98

The development of wind power as a source for the generation of electricity has led to the establishment of wind farms where multiple wind turbines are erected. Although wind turbines are environmentally safe, wind turbines are reportedly hazardous to flying birds. The birds cannot effectively see the blades of the wind turbines as they are rotating. As such, the birds will have a tendency to fly into the moving turbines and can be maimed or killed. Additionally, the blades of the wind turbine can be substantially damaged when striking with such flying birds.

Motion smear is the degradation of the visibility of rapidly moving objects that results in the inability of the retina of the eye to process the high temporal frequencies of stimulation that result from high velocities of retinal-image motion. In the case of wind turbines, motion smear occurs primarily at the areas adjacent to the tips of the blades. This makes them deceptively transparent at the high-retinal image velocities. Attempts to minimize motion smear have taken into account its cause and attempts to reduce the temporal frequency of stimulation of the retina. Anti-motion smear patterns are designed to do this by not repeating the pattern in one location on a turbine blade at the same location on any other blade. In a three-blade turbine, the temporal frequency of stimulation is thereby reduced by a factor of three. In birds, the rod and cone patterns of the retina are much greater than in humans. As such, at nighttime, birds process four to six times the ability of humans to distinguish color and to see objects. With wind turbine blades, the blades are typically canted at an angle with respect to the hub. As such, if the bird approaches the blades at an angle, it becomes very difficult for the bird to see the rotating blades.

Importantly, it has been found that birds have a fourth cone in the retina of their eyes. This produces higher resolution and a binocular vision. As such, unlike humans, birds can actually see ultraviolet radiation having a wavelength of less than 390 nanometers. Additionally, the left brain and right brain of birds cooperate with the left eye and right eye, respectively, so as to allow the birds to focus on two things at the same time. This allows the birds to maintain their speed while avoiding hindrances and obstructions. This structure of the eyes of the birds has caused the birds to be attracted to a constant red color. In many existing wind turbines, there is a red warning light located on the tower. This red light can have a tendency to attract birds flying in the direction of the wind tower. Typically, this light is constant. Since current wind turbines have blades that sweep an area up to 510 feet in diameter, and across nearly two acres of space, it is important to be able to direct the flying birds substantially away from the tower of the wind turbine and away from the blades of the wind turbine. Furthermore, it is important to be able to keep the birds away from the rotating blades of the wind turbine in inclement weather where the white color of the blades will tend to blend with the daytime sky.

Data has shown that anti-motion smear patterns produce a higher pattern of the electroretinogram amplitude from the retina. This translates into a higher pattern visibility at a given distance. For example, at a retinal velocity of 120° of visual angle per second, the most effective anti-motion smear patterns produce pattern electroretinogram amplitudes that are three times the amplitude of the blade with no patterns. A single, solid black blade, when paired with a pair of white blades, is one with the most visual stimulus because it may stimulate a larger area of the retina than striped blades. Even though these anti-motion smear patterns are more visible at a distance of approximately twenty-five meters than black blades or blades with blades with unstaggered, repeating patterns, as the bird gets closer to the blades, the retina is unable to process the progressively higher retinal-image velocities and all patterns rapidly lose visibility with decreasing distance.

In an effort to address the issues associated with avoiding birds, the present Applicant developed U.S. Pat. No. 8,025,480, issued on Sep. 27, 2011 for a wind turbine blade with an avian avoidance surface. This invention is shown in FIGS. 1 and 2 herein.

Referring to FIG. 1, there is shown the wind turbine apparatus 10 in accordance with teachings of the prior art patent. The wind turbine apparatus 10 includes a hub 12 having a first blade 14, a second blade 16 and a third blade 18 extending radially outwardly therefrom. Each of the blades 14, 16 and 18 is canted with respect to the hub 12 so as to receive the force of the wind thereon for the rotation of the hub 12 and the generation of electrical energy from a turbine associated with the hub 12.

Each of the blades 14, 16 and 18 has an arrangement of color bands thereon. The blade 14 has a first color band 20, a second color band 22 and a third color band 23. The first color band 20 is of a different color than the color of the second color band 22 and the third color band 23. The first color band 20 is of a red color. The second color band 22 is of a white color. The third color band 23 is of a blue color. There is a space 24 between the first color band 20 and the second color band 22. This space 24 can expose the white color of the blade 14 or can have a luminescent band 26 affixed thereto and between the first color band 20 and the second color band 22. A luminescent band 28 also extends around the periphery of the blade 14. The luminescent bands 26 and 28 can have a width of between 1/32 inch and 3/4 inch. The luminescent bands 26 and 28 are luminescent threads that affixed to the surface of the blade 14. The luminescent band 26 will extend generally tangentially relative to a circumference of the blade 14. The luminescent bands 26 and 28 are of a white luminescent material.

As can be seen in FIG. 1, the color bands extend across the surface of the blade 14. The third color band 23 is positioned on a side of the second color band 22 opposite to the first color band 20. Another color band 32 is positioned on a side of the third color band 22 opposite to the second color band 22. This color band 32 would be of a red color. Another color band 34 is formed on the surface of the blade 14 on a side of the first color band 20 opposite to the second color band 22. Color band 34 would be of a blue color.

Another color band 36 is formed on the tip 38 of the blade 14 on a side of the color band 34 opposite to the first color band 20. Color band 34 would be of a blue color. The various color bands 20, 22, 30, 32, 34 and 36 should be of alternating colors. These alternating colors should be of red, white and blue. A luminescent band 40 will extend between the color bands 22 and 24. A luminescent band 42 will extend between the bands 30 and 32. A luminescent band 44 extends between the bands 20 and 34. Another luminescent band 46 will extend between the bands 34 and 36.

It can be seen in FIG. 1 that the color band 20 is spaced by an equal distance from the hub 12 on each of the blades 14, 16 and 18. Similarly, the second color band 22 is spaced by an equal distance from the hub 12 on each of the blades 14, 16 and 18. As such, the color on each of the blades will correspond to the same color on another blade.

FIG. 2 illustrates a detailed view of the arrangement of colors and luminescent bands on the blade 14 shown in FIG. 1. In particular, it can be seen that the first color band 20 is of a red color. The second color band 22 is of a white color. The third color band 23 is of a blue color. The luminescent band 26 is positioned in the space between the first color band 20 and the second color band 22. The luminescent band 28 is illustrated as extending along the periphery 50 of the blade 14. Although FIG. 2 illustrates the luminescent band 28 slightly inwardly of the periphery 50, this luminescent band 28 can actually be formed on the edge of the blade 14. A luminescent thread 52 extends along side 54 of the blade 14. A luminescent band 56 extends along side 58 of the blade 14. A luminescent thread 52 will have a diameter of approximately 1/32 of an inch. The luminescent band 56 will have a width of 3/4 of an inch. The luminescent band 28 will be of similar widths or diameters on each side.

After extensive experimentation, it was found that the subject matter of U.S. Pat. No. 8,025,480 produced a generally constant color of red adjacent to the outermost tip of the blade. This is because the pattern of the colors on one blade are similar to the pattern of colors on an adjacent blade. As such, as the blades would rotate, a constant circular red-colored configuration would make an appearance to the flock of birds. In view of the nature of birds to be attracted to the color red, there is a tendency of birds to fly toward the outermost tip of the blades and suffer injury as a result thereof. As such, a need developed so as to avoid this constant presentation of a red color at the blades. Furthermore, a need developed so as to assure that birds would be able to see the rotating blades under twilight or nighttime conditions.

In the past, various patents have issued with respect to systems directed toward wind turbine systems which attempt to avoid birds and other flying fowl. For example, U.S. Pat. No. 6,623,243, issued on Sep. 23, 2003 to W. Hodos, describes a method and apparatus for reducing avian collisions with wind turbines. A design or pattern is placed on the rotor blades of a wind turbine for reducing the motion smear of the image of the rotor blades on the bird's retina. When the motion smear on the bird's retina is reduced, the bird is capable of detecting the presence of the rotor blades more easily. This allows the bird to re-direct its flight path and avoid colliding with the wind turbine. In this patent, the design principle is that a pattern placed in a given location on one rotor blade is not repeated in the same location on any other rotor blades on the wind turbine. Although this provides an improved approach for avoiding avian collisions, ultimately, the patterns on the blades will tend to blend with one another so that the bird will perceive no difference between the separate colors. This arrangement provides no depth image to the bird and, as such, is not very effective at preventing collisions. In other words, as the blades rotate, a relatively smooth pattern ultimately develops as the blades spin rather rapidly. The bird will perceive no "chopping" between the separate blades and, as such, is not able to redirect its flight in the manner desired.

U.S. Pat. No. 6,945,752, issued on Sep. 20, 2005 to Wobben, describes a windpower generator in which the rotor blade includes a rotor blade connection and a rotor blade tip with a surface that is arranged therebetween. The surface is divided into at least two regions which differ with respect to lightness. The lighter regions are arranged closer to the rotor blade connection than the darker region. The darker region is of a natural shade and/or daylight sky shade.

U.S. Pat. No. 2,701,540, issued to Hamilton, describes the application of fluorescent paint to a propeller as integrated with a spiral stripe located on the propeller blade. The fluorescent material allows the blade to be more easily seen under nighttime conditions.

U.S. Pat. No. 6,887,031, issued to Tocher, describes a habitat-friendly wind energy generator. Large diameter concentrator wings capture and extract energy from a large area of the wind relative to the frontal area of the turbine shroud. At the same time, the wings presents a highly noticeable object to birds in flight. The concentrator wings are made more noticeable by the application of contrast in colors, shades or patterns made on these elements for installation of the embodiments of the wind energy generator within relatively featureless landscapes, such as prairies or deserts. The use of the markings and colorings also serves to improve the blending within other highly textured natural landscapes while minimizing hazards to birds in flight. It is desired that the wind turbines visually blend with the forest landscape.

U.S. Pat. No. 6,641,366, issued to Nordhoff, describes a windpower generating system with an obstruction lighting or night marking device. The blade includes insertion areas that have partial fiberoptical bundles integrated into their composite fiber material. These integrated partial optical fiber bundles result from an inner face arranged in the frontal area of the rotor blade. Light can be projected through these optical fiber bundles so as to allow the blade to be observed in nighttime conditions.

U.S. Pat. No. 9,886,864, issued on Feb. 6, 2018 to Chubb et al., discloses a method for aerial avoidance where an airborne wind turbine is prevented from coming into contact with airborne objects, such as birds and bats. The airborne wind turbine determines location and characteristics of the incoming airborne objects. Depending on the determined risk value, the airborne wind turbine may ship the location of the aerial vehicle in order to avoid the risk of colliding with the airborne objects. Other considerations used by the airborne wind turbine's determination can include whether the aerial vehicle can continue to generate electricity while performing the avoidance maneuver.

U.S. Patent Application Publication No. 2008/0298962 published on Dec. 4, 2008 to J. W. Sliwa, discloses a method and apparatus for reducing bird and fish injuries and deaths at wind and water-turbine power-generation sites. This method and apparatus comprises one or more instantaneously inflatable mini-airbags on the turbine blade leading edges which, in the stowed position, are highly conformably elastically wrapped around or juxtaposed to the turbine blade surfaces and/or edges so as to not affect the blades's aerodynamic characteristics. The airbags can be activated and restowed or re-collapsed very rapidly so as to not significantly negatively impact the operational efficiency of the wind turbine.

U.S. Patent Application Publication No. 2012/0155058, published on Jun. 21, 2020 to J. M. Pujol Artigas, discloses a wind generator with protection for flying animals that includes a rotor arranged for rotating about a shaft and provided with a central body and a plurality of blades connected to the central body. The rotor is operatively connected for moving an electric generator. At least one of the blades of the rotor has at least one light-emitting element covered by a translucent or transparent luminous cover extending along at least one portion of the length of the blade. The luminous cover is made of a light-transmissive material capable of transmitting the light emitted by the light-emitting element along the entire length of the luminous cover for the purpose of creating a luminous effect capable of frightening flying animals.

European Patent No. 3 183 603, published on Feb. 25, 2016, discloses bird or bat detection and identification for wind turbine risk mitigation. This is an automated system for mitigating risk from a wind turbine to airborne animals of a predetermined species and includes a plurality of optical-imaging sensors and a controller. The controller receives and analyzes images from the optical-imaging sensors to automatically send a signal to curtail operation of the wind turbine to a predetermined risk mitigating level when the controller determines from images from the optical imaging-imaging sensors that an airborne animal of the predetermined species is at risk from the wind turbine. The controller subsequently sends a signal to resume normal operation of the wind turbine when the controller determines from additional images from the optical-imaging sensors that there is no longer risk from the wind turbine to the airborne animal of the predetermined species.

It is an object of the present invention to provide a wind turbine apparatus that serves to reduce avian mortality and injury.

It is another object of the present invention to provide a wind turbine apparatus that avoids blade damage resulting from avian collisions.

It is another object of the present invention to provide a wind turbine apparatus that minimizes downtime associated with the repair of blades.

It is another object of the present invention to provide a wind turbine apparatus that can be seen by avian populations in cloudy conditions or in nighttime and twilight conditions.

It is another object of the present invention to provide a wind turbine apparatus that creates a visible pulsating appearance to avian populations.

It is still a further object to the present invention provide a wind turbine apparatus that creates an appearance of oblique curves or a "balls of color" to bird populations flying in proximity to the blades of the wind turbine apparatus.

It is another object of the present invention provide a wind turbine apparatus in which the avian avoidance elements can be retrofitted to the blades.

It is another object of the present invention provide a wind turbine apparatus that is operable in daylight and nighttime conditions.

It is still a further object the present invention provide a wind turbine apparatus which is easy to use, easy to manufacture and easy to operate.

These and other objects and advantages of the present invention will become apparent from a reading of the attached specification and appended claims.

BRIEF SUMMARY OF THE INVENTION

The present invention is a wind turbine apparatus that comprises a tower and a plurality of blades rotatably mounted relative to the tower. Each of the plurality of blades has reflective media on a surface thereof. The reflective media comprises at least a pair of primary colors. Each primary color of the pair of primary colors is different from each other. The reflective media of the pair primary colors on one of the plurality of blades is arranged in an order different than an order of the pair primary colors of an adjacent blade of the plurality of blades. The reflective media can further comprise a mixed color of white.

In the wind turbine apparatus of the present invention, the pair of primary colors and the mixed color of white each comprise a band affixed to a surface of the blade. The band extends across the entire width of the blade. The band extends across the width of the of the blade on a wind-facing surface of the blade. The band also extends over a leading edge of the blade and extends across at least 50% of a downward surface of the blade. In particular, the band can be a strip of reflective tape that is adhesively secured to the blade.

In the wind turbine apparatus of the present invention, the plurality of blades includes three blades extending radially outwardly of a rotor. The rotor is supported by the tower. The reflective media comprise a first band of one of the primary colors, a second band of another of the primary colors and a third band of the mixed color of white. Each of these bands extends across a surface of the blade. The first, second and third bands are in spaced relation to each other adjacent to the tip of the blade. In particular, the first band is of a red color having a wavelength of greater than 650 nanometers in less than 700 nanometers. The second band is a blue color having a wavelength of greater than 450 nanometers and less than 500 nanometers. The mixed color of white has a wavelength of less than 550 nanometers. The first blade has reflective media arranged in an order of the first band, second band and third band in order as extending in a direction from the tip of the blade. The second blade has reflective media arranged in order of the second band, the third band and the first band in order as extending in a direction from the tip of the blade. The third blade has reflective media arranged in order of the third band, first band, and second band in order as extending in a direction from the tip of the blade.

An end cap is affixed to the tip of the blade. The end cap has a reflective color matching the reflective media of the band closest to the tip of the blade. The reflective media of the first, second and third bands can also comprise an array of LEDs embedded in the blades. This array of LEDs can be configured so as to produce the relevant primary color (or mixed color of white) and to shift on-and-off so as to produce a strobe-like effect.

In the wind turbine apparatus the present invention, a light source is directed toward the plurality of blades. The light source is positioned in spaced relation to a base of the tower. The light source comprises at least four strobe lights positioned in spaced relation to each other and extending around the base of the tower. Each of the strobe lights has a flash energy of between 10 and 150 joules and a flash duration of between ten milliseconds and one-half second. Each of the strobe lights fires sequentially such that at least three strobe lights are off when one strobe light flashes. The light source has a near-infrared color of a wavelength of greater than 740 nanometers. The light source in particular comprises a housing having a funnel-shaped aperture with a blue lens positioned within the funnel-shaped aperture.

This foregoing Section is intended to describe, the preferred embodiments of the present invention. It is understood that modifications to these preferred embodiments can be made within the scope of the present claims. As such, this Section should not to be construed, in any way, as limiting of the broad scope of the present invention. The present invention should only be limited by the following claims and their legal equivalents.

DETAILED DESCRIPTION OF THE INVENTION

Figure 1:
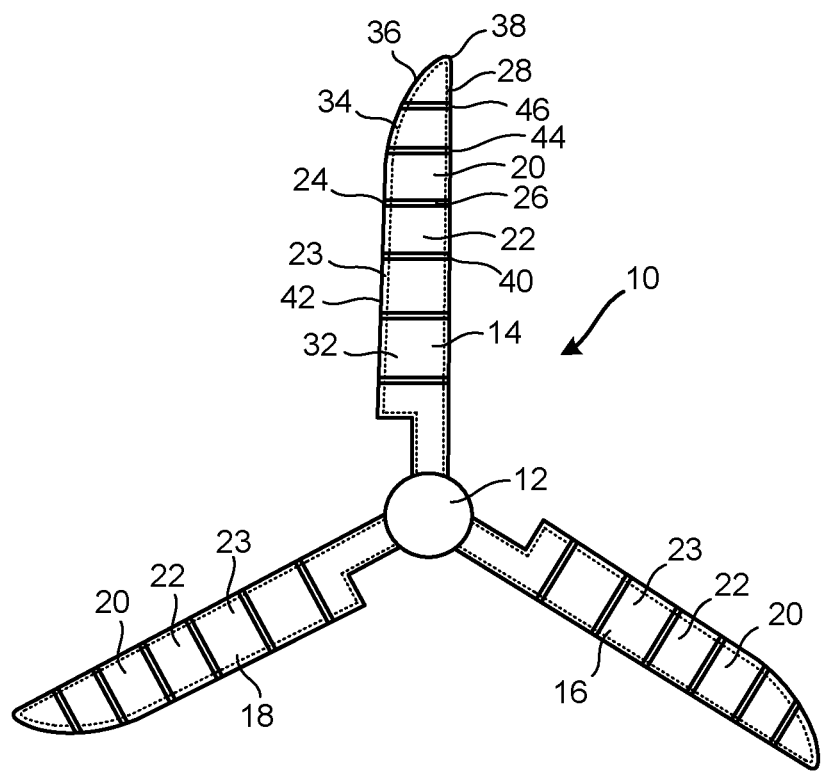
FIG. 1 is a frontal view showing the wind turbine apparatus in accordance with a prior art wind turbine apparatus.
Figure 2:
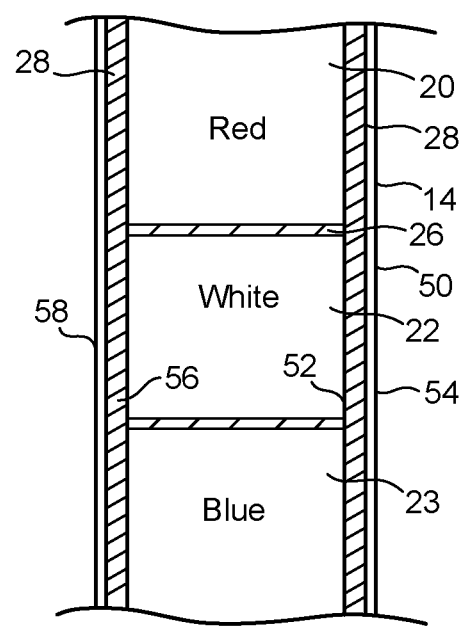
FIG. 2 is a detailed view showing the color separation and luminescent bands on a single portion of a single blade of the prior art wind turbine apparatus.
Figure 3:
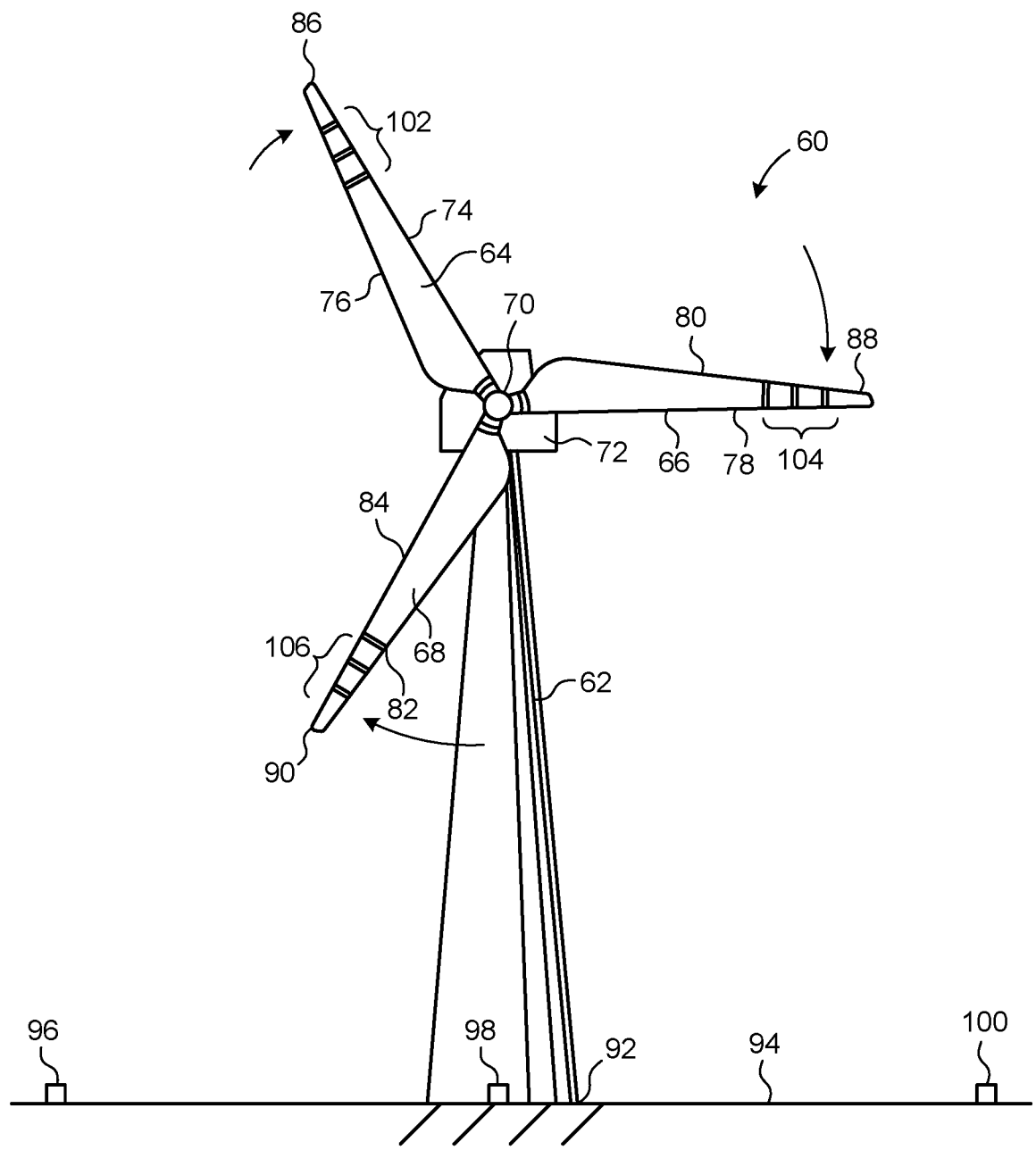
FIG. 3 is a front elevational view showing the wind turbine apparatus of the present invention.

FIG. 3 shows the wind turbine apparatus 60 in accordance with the teachings of the present invention. The wind turbine apparatus 60 includes a tower 62 and a plurality of blades 64, 66 and 68 extending radially outwardly of a rotor located adjacent to the top of the tower 62. A generator or turbine 72 is positioned at the top of the tower 62 and serves to produce energy from the rotating blades 64, 66 and 68.

Blade 64 includes a leading edge 74 and a trailing edge 76. Blade 66 includes a leading edge 78 and a trailing edge 80. Blade 68 includes a leading edge 82 and a trailing edge 84. Blade 64 has an end cap 86 located at the end of the blade 74 opposite the rotor 70. Blade 66 includes an end cap 88 affixed at the end of blade 66 opposite the rotor 70. Blade 68 has an end cap 90 affixed at a tip of the blade 68 opposite the rotor 70.

The tower 62 has a generally frustoconical configuration. The wide base 92 is generally supported on the ground 94. In the present invention, there will be a plurality of light sources 96, 98 and 100 that are positioned around the bottom 92 of the tower 62 so as to direct light inwardly and upwardly toward the blades 64, 66 and 68. The plurality of light sources can emit white light or black light. There is another light source on the opposite side of the tower 62 from light source 98 (not shown in FIG. 3).

The wind turbine apparatus 60 in the present invention shows that blade 64 has bands of color 102 affixed to a surface of blade 64 generally adjacent to the end 86. Similarly, blade 66 has a set of bands 104 arranged adjacent to the end cap 88. Similarly, blade 68 has a set of bands 106 positioned generally adjacent to the end cap 90. In the present invention, the band set 102 will include bands of different colors arranged in spaced relation to each other. Band set 104 will include bands of different colors arranged in spaced relation to each other. Bands set 106 will include bands of colors that are arranged in spaced relation to each other. The bands of colors will be of a reflective material. Typically, the bands of color will be colored tape affixed to the blades. As will be described hereinafter, the tape is affixed to each of the blades so as to extend over the leading edges 74, 78 and 84 so as to a have a portion extending across the back surface of each of the blades 64, 66 and 68.

Importantly in the present invention, the order of the colors of the band set 102 will be different than the order of colors of the band set 104 and different from the order of colors from the band set 106. This is shown, in particular, in association with the illustrations of FIGS. 4A-4C. This arrangement of colors will create a "pulsating" effect as the blades 64, 66 and 68 rotate. As can be imagined, as the color adjacent to the end cap 86 on blade 64 rotates, the constant color appearance will be replaced by the color of the band of band set 104 on blade 66. As such, this pulsating effect is created. As the blades continue to rotate, the various colors that are perceived by the retina of the birds will be akin to a "ball of color" or a large number of oblique curves that is constantly changing in a pulsating manner. As such, the appearance of the red color is constantly interrupted with another color so as to avoid an attractive appearance to the bird. The pulsating effect creates a threatening effect to the bird so that birds are likely to avoid the blades of the wind turbine apparatus 60. This avoids injury or death to the birds and also avoids damage to the blades of the wind turbine apparatus 60. This also avoids any repair costs that might be associated from the collision between large birds and the surface of the blades of the wind turbine apparatus 60.

Figure 4A:
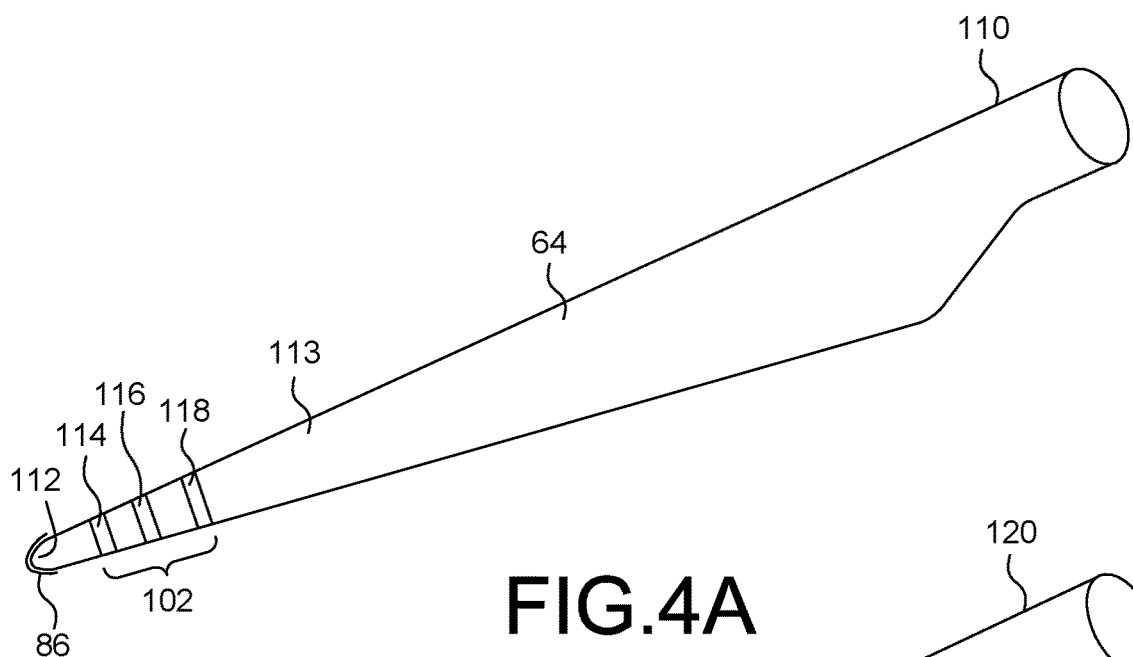
FIG. 4A-4C show the configurations of the wind-facing side of the blades of the wind turbine apparatus of the present invention.
Figure 4B:
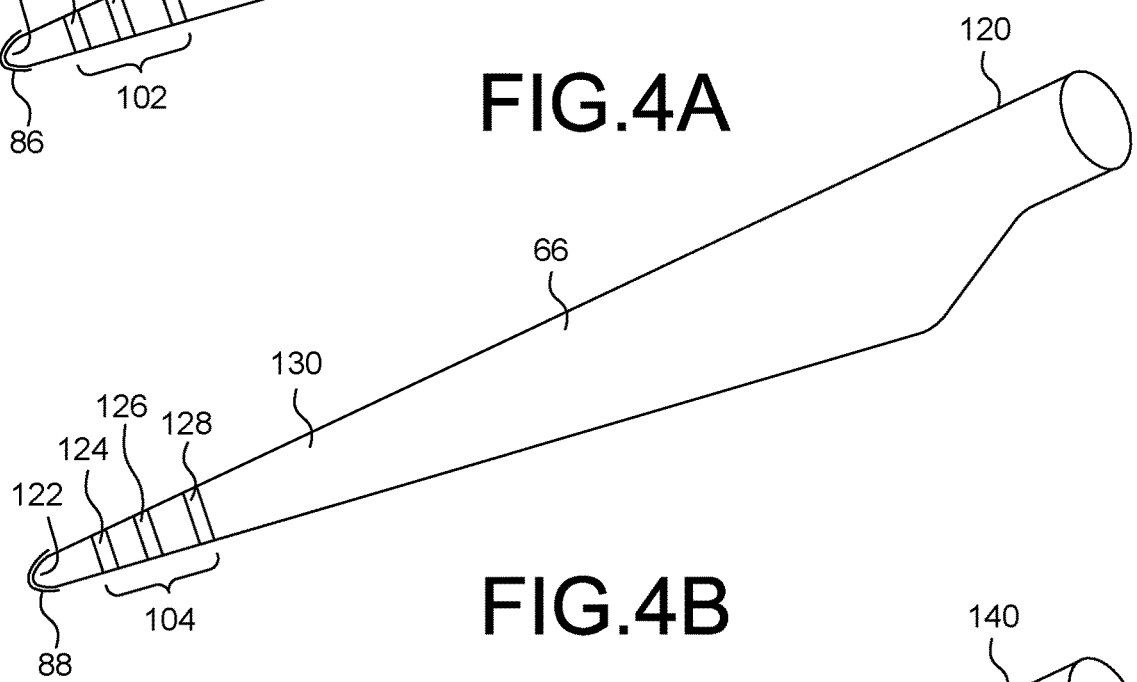
Figure 4C:
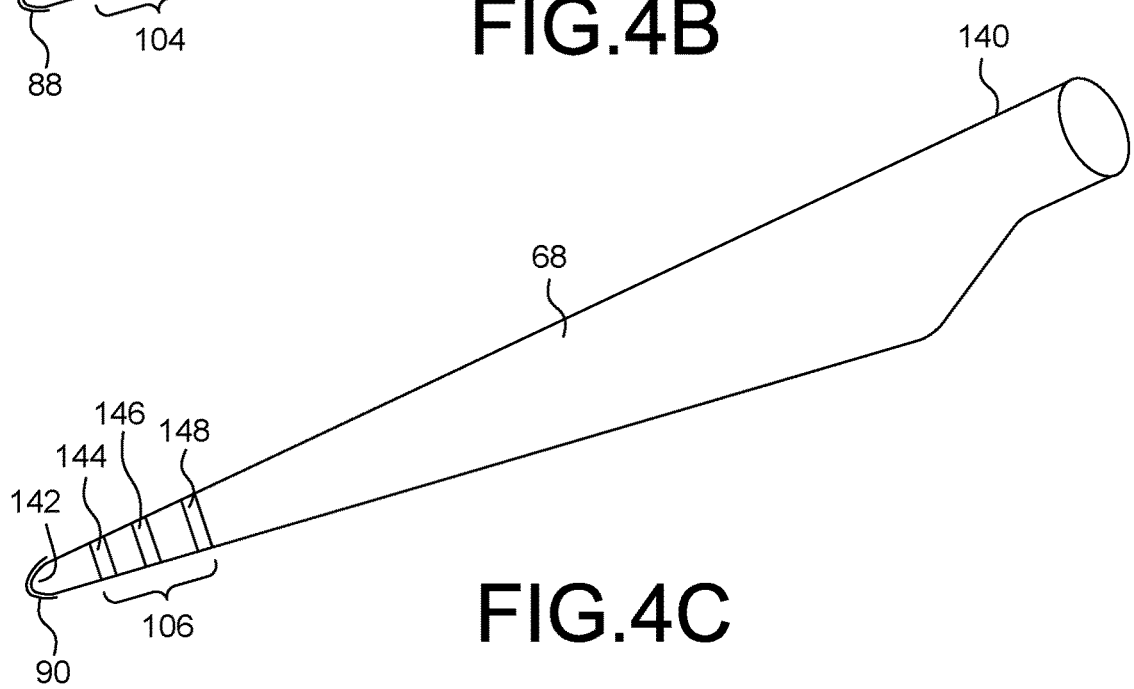

FIGS. 4A-4C show the various configurations of the bands of color associated with each of the blades 64, 66 and 68. In FIG. 4A, it can be seen that blade 64 includes a root 110 and a tip 112. End cap 86 is affixed over the tip 112. Band set 102 is affixed to the surface 114 of the blade 64 generally adjacent to the tip 112. Band set 102 includes primary colors 114 and 116 of the band set 102. A mixed color of white 118 is also part of band set 102. In particular, the band 114 will be of a red color having a wavelength of greater than 650 nanometers and less than 700 nanometers. Band 116 will be a blue color having a wavelength of greater than 450 nanometers. The band 118 will be a mixed color of white having a wavelength of less than 550 nanometers. Each of the bands 114, 116 and 118 extends entirely across the width of the blade 64 and is affixed to the wind-facing surface 113 of blade 64.

In FIG. 4B, the blade 66 has a root 120 and a tip 122. End cap 88 is affixed to tip 122. The band set 104 is positioned generally adjacent to the tip 122. Band set 104 includes a blue band 124, a band of mixed white color 126, and a red band 128 arranged in spaced relation to each other. Each of the bands 124, 126 and 128 extend entirely across the wind-facing surface 130 of the blade 66.

In FIG. 4C, it can be seen that the blade 64 includes a root 140 and a tip 142. The end cap 90 is affixed to tip 142. Band set 106 has an arrangement of bands in which band 144 is of a mixed color of white, band 146 is a band of red color, and band 148 is a band of blue color. As such, it can be seen that the primary colors and the mixed color of white of the reflective media associated with blades 64, 66 and 68 are arranged in a different order on each of the blades. These bands are in spaced relation to each other. Importantly, each of the end caps 86, 88 and 90 should have a color matching the color of the band closest to it. As such, end cap 86 should have the same red color as band 114 on blade 64. End cap 88 should have the same color as blue band 124 of blade 66. End cap 90 should have the same color as the band of mixed white 144 of blade 68. The end caps 86, 88 and 90 are important to visualization by birds of prey. Since birds of prey tend to perch and are on the lookout for our other birds or animals, the color of the end caps 86, 88 and 90 will tend to discourage any attempt by a bird of prey to get too close to the rotating blades 64, 66 and 68.

Importantly, as stated before, the various bands associated with each of the blades 64, 66 and 68 can be the nature of a reflective tape that is applied to the surfaces of the blades. Alternatively, a band or array of LEDs can be substituted for the reflective tape so as to convey the same visual appearance. If it is desired to have a "strobe" effect, then suitably programmed in electronics can be utilized so as to cause these LEDs to create an on-and-off pattern akin to that of a strobe effect.

Figure 5:
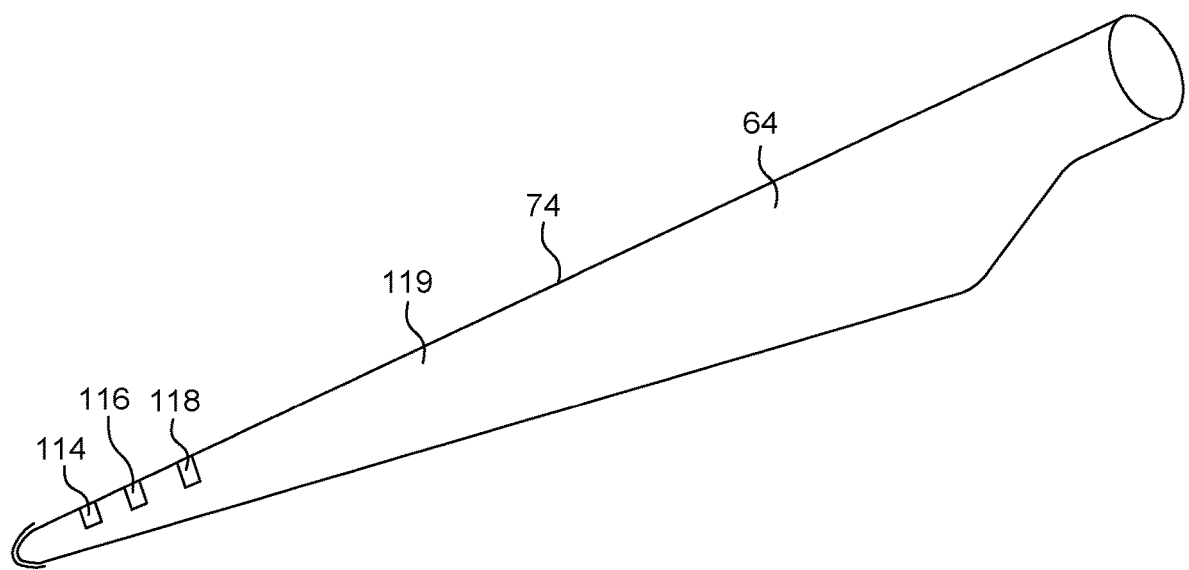
FIG. 5 is a back view of the blades of the wind turbine apparatus, in particular, showing the configuration of the reflective media on the downwind surface of the blade.

FIG. 5 shows the structure of backside of blade 64. It should be noted that the other blades 66 and 68 will have a similar structure. As can be seen, the bands 114, 116 and 118 extend for only approximately 50% of the width of the surface 113 of the surface 119 of blade 64. Since birds generally fly in the direction of wind and since the blades of a wind turbine generally face the direction of wind, it is very unlikely that birds will fly into the rotating blades from the backside from of the blades. As such, the amount of illumination and color presented on the surface 119 of blade 64 can be minimized. Importantly, where the bands 114, 160 and 118 are in the nature of reflective tape, this tape can be applied so as to extend over the leading edge 74 of blade 64. As such, as the blade 64 rotates, the force of wind against the surfaces of the reflective tape associated with bands 114, 116 and 118 will fix the bands at the leading edge 74 and will avoid any tendency for wind to separate the bands from the blade. Each of the bands 114 and 160 and 118 can be covered with a sealant material.

Figure 6:
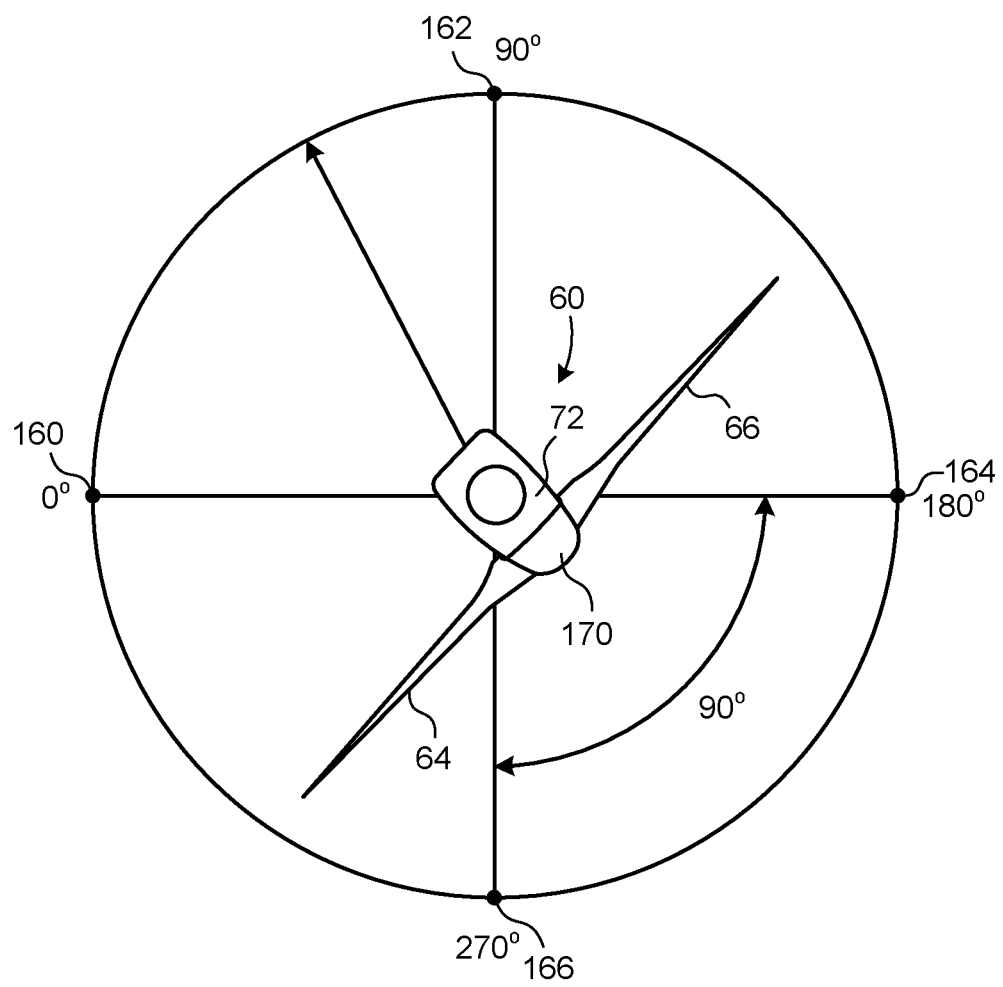
FIG. 6 is a plan view showing the configuration of the strobe lights in conjunction with a wind turbine apparatus of the present invention.

FIG. 6 shows the wind turbine apparatus 60 having blades extending outwardly therefrom. The blades 64 and 66 extend radially outwardly of a rotor 70. Rotor 70 is connected to the turbine housing 72. Turbine housing 72 is supported above the tower 62 and, in particular, rotatably mounted thereon. As such, the blades 64 and 66 (along with a blade 68) can be moved so as to face the direction of wind.

Importantly, in the present invention, there are light sources 160, 162, 164 and 166 that are positioned so as to direct light toward the blades 64 and 66 of the wind turbine apparatus 60. The light sources 160, 162, 164 and 166 are positioned in spaced relation to each other generally adjacent to the base of the tower 62. In particular, the light sources 160, 162, 164, and 166 are strobe lights. Each of the strobe lights has a flash energy of between 10 and 150 joules and a flash duration of between ten milliseconds and one-half second. The amount of power of the flash and the timing and the flash duration can be adjusted relative to wind speed, the rotation of the blades, and to ambient conditions. Each of the light sources 160, 162, 164 and 166 fire sequentially such that three strobe lights are off when one of the strobe flashes. Each of the light sources 160, 162, 164 and 166 is of a near-infrared color of a wavelength of greater than 740 nanometers.

Figure 7:
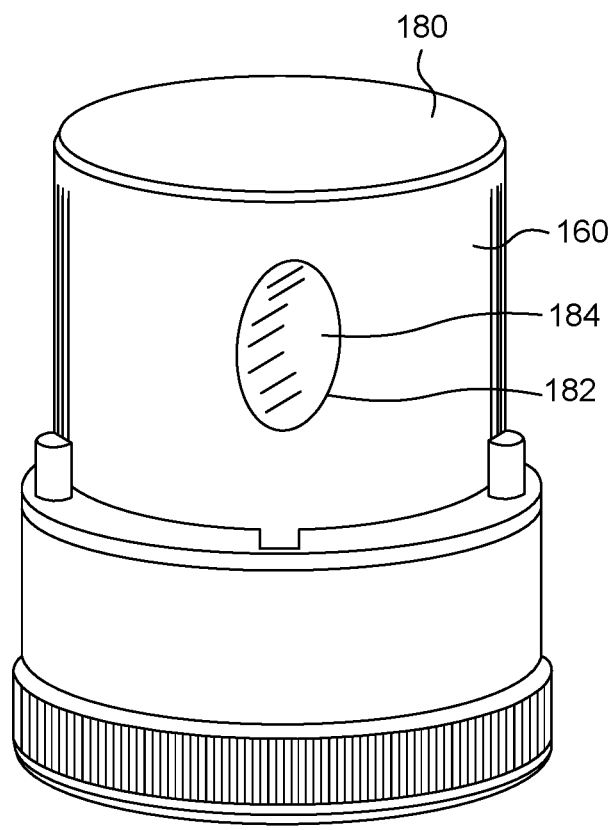
FIG. 7 is a perspective view showing one of the strobe lights as used in the wind turbine apparatus of the present invention.

FIG. 7 shows one of the light sources 160. The other light sources 162, 164 and 166 have a similar configuration. Importantly, the light source 160 has a housing 180. Housing 180 has a funnel-shaped aperture 182 with a blue lens 184 therein.

In the past, as the sky changes colors, the blades would tend to be transparent and/or blend with the appearance of the sky. The use of the strobe lights of the present invention serve to cooperate with the various colors of the bands used on each of the blade so as to create a ball of color that has a spectrum that includes ultraviolet radiation such that the fourth cone of the retina of the birds can visualize. This will be in the cyan and magenta range. Since the preferred wavelength of light emitted by the strobe is 900 nanometers, it is almost in the near-infrared range. When the white light of the strobe fires through the blue lens 184, the blue light combines with the red and blue colors of the band so as to create this ultraviolet appearance to the birds. Strobe lights can be programmed to whatever shade of white is most appropriate. The blue band can be shifted by changing energy of the white light from the strobes. This can be utilized so as to compensate for cloudy skys. The white light of the strobe is oscillated so as to move the blue band into an oscillating band. As such, the light emitted by the reflective media on the blades will become quite visible and also of visible in the ultraviolet range.

The present invention creates a mesh of swirling color bands. This is because of the switching of the strobe in combination with the switching of the order of the reflective media on the blades. Also, since one strobe fires and then turns off, and the next strobe lights up 90° away from the first strobe, this adds to the ball of color created at the blades of the wind turbine apparatus and further creates the unattractive pulsating ball of color which tends to repel birds. When wind conditions change, the strobe light frequency can be changed. The firing of the strobe light, in particular, the omission of white light for the blue lens will tend to wash out the red primary color on the blades. Typically, the image presented to the cones of the retina of the bird will be a ball of faint violet color.

Relative to FIG. 7, it can be seen that the aperture 182 is funnel-shaped such that a wide end of the funnel is interior of the housing 180 and the narrow end of the funnel is at the surface of the housing 180. This tends to concentrate the light emitted by the light source 160.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. A wind turbine apparatus comprising:
   a tower;
   a plurality of blades rotatably mounted relative to said tower, each of said plurality of blades having reflective media on a surface thereof, the reflective media comprising at least a pair of primary colors, each primary color of the pair of primary colors being different from each other, the reflective media of the at least a pair of primary colors on one of said plurality of blades being arranged in an order different than order of the at least a pair of primary colors of an adjacent blade of said plurality of blades;
   the reflective media further comprising a mixed color of white;
   the plurality of blades comprising three blades extending radially outwardly of a rotor, the rotor being supported by said tower, the reflective media comprising:
   a first band of one color of the at least a pair of primary colors, said first band extending across a surface of the blade;
   a second band of another color of the at least a pair of primary colors, the second band extending across the surface of the blade; and a third band of the mixed color of white, said third band extending across the surface of the blade; and said first, second and third bands being in spaced relation to each other adjacent to a tip of the blade.

2. The wind turbine apparatus of claim 1, the first, second and third bands extending across the entire width of the blade on a wind-facing surface of the blade.

3. The wind turbine apparatus of claim 2, the first, second and third bands extending over a leading edge of the blade and extending across at least 50% of a downwind surface of the blade.

4. The wind turbine apparatus of claim 1, the first, second and third bands comprising a strip of reflective tape.

5. The wind turbine apparatus of claim 1, said first band being of a red color having a wavelength of greater than 650 nanometers and less than 700 nanometers, said second band being a blue-collar having a wavelength of greater than 450 nanometers and less than 500 nanometers, the mixed color of white having a wavelength of less than 550 nanometers.

6. The wind turbine apparatus of claim 5, wherein a first blade of said plurality of blades has reflective media arranged in an order of first band/second band/third band in order as extending in a direction from the tip of the blade, a second blade of said plurality of blades having reflective media arranged in an order of second band/third band/first band in order as extending in the direction from the tip of the blade, a third blade of said plurality of blades having reflective media arranged in an order of third band/first band/second band in order as extending in the direction from the tip of the blade.

7. The wind turbine apparatus of claim 6, further comprising:

an end cap affixed to the tip of each blade of said plurality of blades, said end cap having a reflective color matching the reflective media of the one of the first, second and third bands that is closest to the tip of the blade.

8. The wind turbine apparatus of claim 1, the reflective media of the first, second and third bands comprising an array of LEDs embedded in the blade.

9. The wind turbine apparatus of claim 1, further comprising:

a light source directed to said plurality of blades.

10. The wind turbine apparatus of claim 9, said light source being positioned in spaced relation to a base of said tower.

11. The wind turbine apparatus of claim 10, said light source comprising at least four strobe lights positioned in spaced relation to each other and extending around the base of the tower.

12. The wind turbine apparatus of claim 11, each of said at least four strobe lights having a flash energy of between ten and one hundred and fifty joules and a flash duration of between ten milliseconds and one-half second.

13. The wind turbine apparatus of claim 11, each of said at least four strobe lights firing sequentially such that at least three strobe lights of the at least four strobe lights are off when one strobe light of the at least four strobe light flashes.

14. The wind turbine apparatus of claim 9, wherein said light source has a near-infrared red color of a wavelength of greater than 740 nanometers.

15. The wind turbine apparatus of claim 9, said light source comprising:

a housing having a funnel-shaped aperture; and a blue lens positioned within the funnel-shaped aperture.

* * * * *